Dec. 11, 1951 E. W. DAVIS 2,578,517
COUPLER FOR LUBRICATING APPARATUS
Filed July 23, 1947 2 SHEETS—SHEET 1
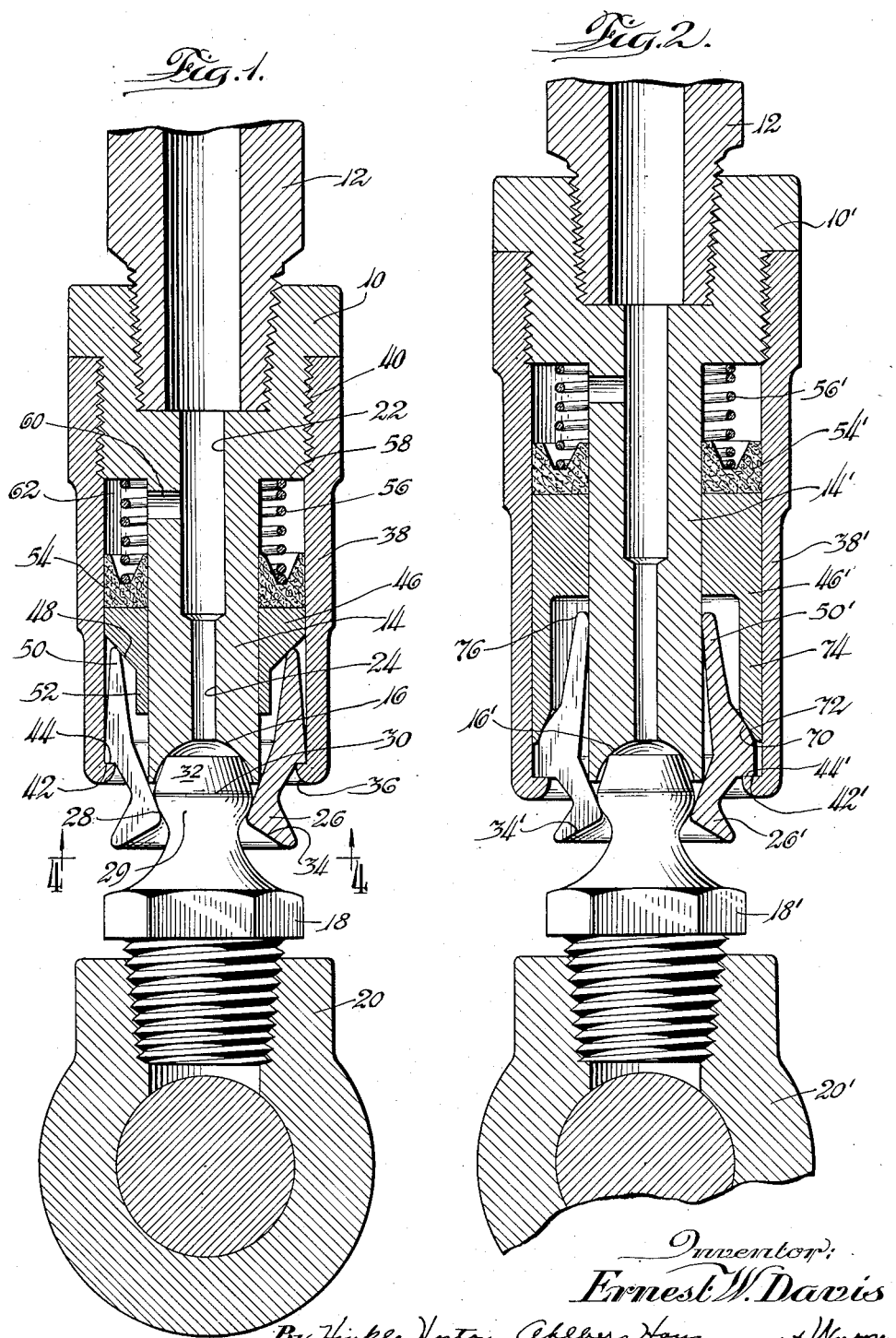
Inventor:
Ernest W. Davis
By Hinkle, Horton, Ahlberg, Hausmann & Wupper
Attorneys

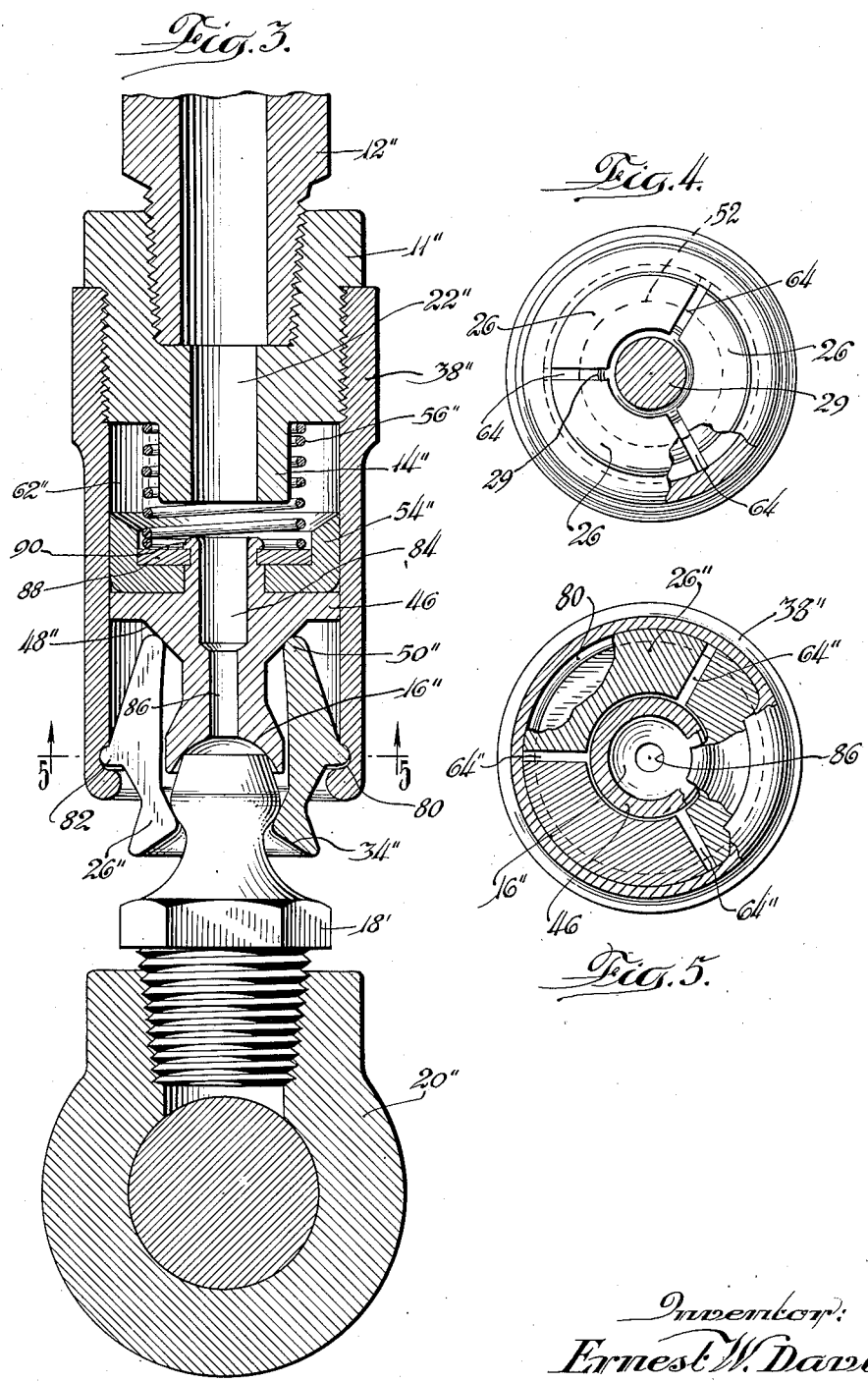

Patented Dec. 11, 1951

2,578,517

UNITED STATES PATENT OFFICE 2,578,517

COUPLER FOR LUBRICATING APPARATUS

Ernest W. Davis, River Forest, Ill.

Application July 23, 1947, Serial No. 763,129

15 Claims. (Cl. 285—168)

My invention relates to couplers for lubricating apparatus.

An object of my invention is to provide a new and improved coupler.

Another object of my invention is to provide a coupler having new and improved means for guiding the coupler in its application to a lubricant receiving fitting or nipple.

Another object of my invention is to provide a coupler which forms a metal to metal seal with the lubricant receiving fitting when the coupler is held at various angles relative to the axis of the fitting and which has clamping jaws provided with means for guiding the coupler in its application to the fitting.

Another object of my invention is to provide a coupler having novel guiding and camming means for facilitating the application of the coupler to and removal of the coupler from a lubricant receiving fitting.

Other objects and advantages will become apparent as the description proceeds.

In the drawings:

Fig. 1 is a longitudinal sectional view through a preferred embodiment of my invention showing it applied to a lubricant fitting attached to a bearing which is also shown in section;

Fig. 2 is a view similar to Fig. 1 but showing another embodiment of my invention;

Fig. 3 is a view similar to Figs. 1 and 2 but showing a third embodiment of my invention;

Fig. 4 is a transverse sectional view taken on the line 4—4 of Fig. 1 and looking in the direction of the arrows; and Fig. 5 is a transverse sectional view taken on the line 5—5 of Fig. 3 and looking in the direction of the arrows.

Referring to the embodiment of Figs. 1 and 4, this embodiment is illustrated as having a base 10 which may be threaded or otherwise attached to a conduit 12 such as the rigid or flexible discharge conduit of a hand compressor or power operated compressor, or any other suitable source of lubricant supply under pressure. The base 10 has a forwardly projecting tubular portion 14 terminating in a concavely spherical sealing surface 16 adapted to engage the inlet end of a lubricant receiving fitting indicated at 18. The fitting 18 is normally attached by threads or by a pressed fit, or in any other suitable manner, to a bearing or other part requiring lubrication. In Fig. 1 the fitting 18 is illustrated as threading into a bearing part 20.

Lubricant supplied through the conduit 12 enters a passage or bore 22 which communicates with a smaller bore 24 having an outlet end opening through the sealing surface 16 and communicating with the inlet end of the fitting. It will be understood that the fitting 18 is provided with the usual passage therethrough and that this passage may or may not be provided with a check valve in accordance with conventional practice.

The pressure of the lubricant between the head of the fitting and the sealing surface 16 of the coupler creates a separating force which tends to push the coupler away from the fitting. In the embodiment of Figs. 1 and 4 this separating force is resisted by jaws 26. In the drawings, three such jaws are shown and this forms a convenient number although other numbers of jaws may be used if desired. Each jaw 26 has a fitting-engaging or gripping part 28 adapted to engage a headed fitting below or inwardly of the largest diameter 30 of the head 32. Beyond its fitting engaging part, each jaw 26 is provided with an outwardly flaring guiding portion 34 adapted to engage the inlet end of the fitting as the coupler is brought into juxtaposition therewith and to guide the application of the coupler to the fitting so that the head of the fitting is inserted between the jaws and engages the concavely spherical sealing surface 16. As the coupler is thus applied to the fitting, the jaws 26 pivot about the inwardly directed flange 36 of a sleeve 38 which is threadedly attached at 40 to the base 10. The flange 36 and jaws 26 have complementary shoulders 42 and 44 respectively which normally serve to prevent the jaws from being displaced from the sleeve 38 and to locate the jaws with respect thereto.

When the coupler is attached to a fitting the jaws 26 are held in engagement with the head of the fitting by a piston 46 having a frusto-conical surface 48 engaging the rounded upper or inner ends 50 of the jaws 26. The piston 46 is annular and moves lengthwise of the coupler between the tubular extension 14 and the sleeve 38 and is preferably provided with a forward extension 52 providing a long bearing surface engaging the extension 14 and preventing cocking of the piston under forces exerted thereon.

An annular packing 54 of synthetic rubber, leather, or other suitable material, is pressed against against the flat upper surface of the piston 46 by a spring 56 seated against a shoulder 58 provided by the base 10. This spring 56 also urges the piston forwardly with sufficient force to cause the jaws 26 to effect an initial grip on the fitting. This initial grip makes it unnecessary to hold the coupler on the fitting after the coupler is applied thereto and before lubricant under pressure is admitted to the coupler, and also creates an initial seal between the coupler and fitting.

A branch passage 60 establishes communication between the longitudinally extending passage 22 and annular chamber 62 between the piston and the shoulder 58. Lubricant under pressure supplied to the coupler through the conduct 12 enters the chamber 62 by way of passages 22 and 60 and exerts a force on the piston 46 proportional to the lubricant pressure. This force urges the frusto-conical surface 48 of the piston against the rounded ends 50 of the jaws 26, thereby tending to pivot these jaws so that the upper or rounded ends thereof move outwardly and the fitting engaging portions 28 are held firmly against the reversely sloped part 29 of the head of the fitting.

When the coupler is unattached to a fitting, the interior of the coupler is under atmospheric pressure and the position of the jaws 26 is controlled by the spring 56. The forward thrust of this spring on the piston 46 swings the upper or rounded ends 50 of the jaws outwardly and moves the fitting engaging portions 26 of these jaws toward each other. The idle or rest position of the jaws 26 may be determined by engagement of the jaws with the extreme end of the tubular extension 14 or by the closing of the gaps 64 between the outer or fitting engaging ends of these jaws, it being immaterial as to the exact manner in which the idle position of the jaws is controlled. It is desirable, however, to design the parts so that the guiding and fitting engaging ends of the jaws have a definite idle position bearing a predetermined relationship to the size of the inlet end of the fitting.

In a normal application the first contact between the coupler and fitting will be between the edge of the fitting and its inlet end and the guiding surface 34 of one of the jaws. This flared guiding surface will guide the coupler laterally so that the coupler is displaced sidewise sufficiently to bring the extreme inlet end of the fitting into contact with the flaring surface 34 of all of the jaws and spread them apart to admit the head of the fitting to the position shown in Fig. 1 with the extreme inward end or edge engaging the concavely spherical sealing surface 16. As the coupler is applied to the fitting, the fitting engaging or outer ends of the jaws are separated and the upper or rounded ends 50 are moved toward each other, thereby producing a backward or retrograde movement of the piston 46 and packing 54 against the resistance of spring 56. As soon as the most constricted portions of the jaws 26 have passed over the largest diameter 30 of the fitting head, the spring 56 moves packing 54 and piston 46 forwardly again, thereby spreading the upper ends of the jaws and causing the lower ends to engage the reversely rounded portion 29 of the fitting. When the coupler is in the fully applied position, as shown in Fig. 1, the spring 56 exerts sufficient force to hold the coupler on the fitting against accidental displacement so that both hands of the operator may be used to operate a lubricant compressor, or for any other purpose. Lubricant under pressure entering the coupler by way of the conduit 12 flows longitudinally through passages 22 and 24 through fitting 18 and into the bearing part. The fitting 18 and parts of the coupler 10, with the exception of the gasket 54, are preferably of metal and the metal to metal contact between the concavely spherical surface 16 and the inlet edge of the fitting prevent escape of lubricant therebetween. In Fig. 1, the coupler and fitting are shown in axial alignment, but the coupler may be swung at any angle to the fitting within the limits determined by engagement of the guiding portions 34 of the jaws 26 with the base of the fitting without breaking the lubricant tight seal between the fitting and the coupler.

The force exerted by the lubricant pressure on the inlet end of the fitting and oppositely disposed portion of the sealing surface 16 tends to separate the coupler and fitting. Separation between the coupler and fitting is prevented by the jaw 26 which are held in engagement with that portion of the head of the fitting beyond the largest diameter thereof by the action of the piston 46. This piston is acted upon by the spring 56 and the pressure of the lubricant entering the chamber 62 by way of branch passage 60. Since the fitting engaging portions of the jaws 26 are located behind the largest diameter of the fitting head, it is not necessary that these jaws exert any frictional grip on the fitting, it sufficing to prevent separation of the fitting engaging ends of the jaws. This is accomplished by the piston which is urged forwardly by a force proportional to the lubricant pressure, except where the lubricant pressure is extremely small and the spring 56 appreciably increases the effect of the lubricant pressure.

After the lubricating operation has been completed, it is customary to release the pressure in the coupler and then remove this coupler from the fitting. This can be accomplished by a straight pull or jerk on the coupler. If desired, the coupler can be removed from the fitting by swinging the coupler to such an angle relative to the axis of the fitting that the flaring portion 34 of one of the jaws engages the base of the fitting to create a camming action which spreads the jaws and separates the coupler from the fitting. This latter mode of removal can be utilized where some lubricant pressure still exists in the coupler. It thus will be seen that the flaring portions 34 of the jaws have a dual function and serve both as guiding means and camming means.

The embodiment of Fig. 2 is a modified form of my invention in which the parts are similarly numbered with a prime added and wherein the principal differences over the earlier embodiment are in the construction and arrangement of the jaws and piston. In this modification of my invention, the base 10', extension 14', and sleeve 38' are essentially the same as the correspondingly numbered parts of Figs. 1 and 4. The piston 46' and jaws 26', however, differ in certain important respects.

Each of the jaws 26' is provided with an annular convexly spherical surface 70 adapted to engage a frusto-conical surface 72 formed on the end of a tubular extension 74 of the pitson 46'. Each jaw 26' also has an upwardly extending end 50' which in this form of my invention engages the outer cylindrical surface of the tubular extension 14' of the base 10'.

In the embodiment of Fig. 2 the jaws pivot about the point 76 at which the upper ends of the jaws engage the extension 14' and the fitting engaging end of these jaws are moved inwardly by the forward movement of the piston 46' under either the force of the spring 56' or the force of lubricant pressure, or both. The sole function of the shoulders 42' and 44' is to prevent the piston from pushing the jaws out of the lower end of the sleeve 38'. Except for the transfer of the pivotal point of the jaws and the transfer of the point of engagement between the jaws and piston, the operation of the embodiment of Fig. 2 is essentially the same as that of Fig. 1 and no detailed description of the mode of operation of the embodiment of Fig. 2 is deemed necessary.

The embodiment of Figs. 3 and 5 is essentially the same as that of Figs. 1 and 4 insofar as the location and operation of the fitting engaging jaws are concerned. The embodiment of Figs. 3 and 5, however, differs from the other two embodiments by having the sealing surface 16'' provided by the piston rather than by a tubular extension of the base. The parts of the embodiment of Figs. 3 and 5 which correspond generally with similar parts of the other embodiments are marked with similar reference numerals but have a double prime ('') affixed thereto.

In Fig. 3 the base 10'' has a short extension 14'' which serves to position the piston actuating spring 56'' and also as a stop for limiting inward movement of the piston 46''. As in the previous embodiments, the base is attached to a conduit 12''.

The sleeve 38'' is like the sleeve 38 of Fig. 1, except for an annular groove 80 which is adapted to receive an arcuate flange 82 on each of the jaws 26''. This flange and groove construction prevents any longitudinal movement of the jaws relative to the sleeve. In order to assemble the jaws in the sleeve it is essential that the spaces 64'' between the jaws 26'' be of sufficient width to permit the jaws to move together sufficiently to withdraw the flanges 82 from the grooves 80.

The jaws 26'' pivot about the flanges 82 and when the coupler is applied to a fitting the spreading of the outer ends of the jaws as the coupler slips over the head of the fitting causes the upper ends 50'' of the jaws to move the piston 46'' backwardly. As soon as the attachment of the coupler to the fitting is completed, the jaws and piston resume the position shown in Fig. 3 under the influence of the spring 56'' and when the lubricant pressure is applied to the coupler, the action of the spring is reinforced by a force proportional to the lubricant pressure.

The piston 46'' provides the concavely spherical sealing surface 16' so that in this form of my invention the only initial seal which can be created between the coupler and the fitting is that resulting from the action of the spring 56'. In the previous embodiments, the corresponding spring effected the usual initial seal but this initial seal could be reinforced by pushing lengthwise on the base or sleeve to increase the sealing force by manual pressure.

The piston 46'' has passages or bores 84 and 86 which connect the passage 22'' and the chamber 62'' with the inlet of the lubricant fitting. A cup-shaped sealing washer 54'' of leather or other suitable material is attached to the piston by a washer 88 secured in place by the rolled-over end 90 of the metal piston. This rolled-over end 90 is so designed that it will engage the extension 14'' before the spring 56'' is completely compressed.

The passageways 84 and 86 in the piston 46'' are preferably made of a size which will offer sufficient resistance to the flow of lubricant to insure adequate gripping and sealing action between the coupler and fitting before lubricant is discharged from the coupler into the fitting. If desired, the spring 56'' of the form shown in Fig. 3, and the corresponding springs 56 and 56' of Figs. 1 and 2 respectively, can be omitted, although in most instances it is desirable to utilize these springs and obtain the benefit of the initial gripping and sealing action between the coupler and fitting which is effected thereby.

From the foregoing description it will be apparent that I have provided a coupler which may assume numerous forms but which may be easily applied to and removed from a lubricant receiving fitting even when the fitting is relatively inaccessible and it is difficult to attach the end of the coupler in proper register with the fitting when contact is first established therebetween. The novel jaws not only provide a means for guiding the application of the coupler to the fitting but also provide a camming means for facilitating removal of the coupler from the fitting. It will be further noted that my novel couplers are of simple and sturdy construction and may be economically manufactured by conventional production methods. Furthermore, my improved couplers may be readily disassembled for inspection or repair.

My invention is not limited to the particular forms shown, but includes all modifications, variations, and equivalents coming within the scope of the appended claims.

I claim:

1. A coupler comprising a base, a sleeve removably secured to said base, said sleeve having an inwardly directed flange at an end remote from said base, jaws partially enclosed in said sleeve and having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said jaws having fitting-engaging parts extending beyond said sleeve and camming parts outside of said sleeve and merging with said fitting-engaging parts, a lubricant operated piston for causing said jaws to clamp a fitting, said piston having an annular inclined jaw-engaging surface, sealing means positioned between said jaws, and a spring for actuating said piston and jaws.

2. A coupler comprising a base, a sleeve removably secured to said base, said sleeve having an inwardly directed flange at an end remote from said base, jaws partially enclosed in said sleeve and having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said jaws having fitting-engaging parts extending beyond said sleeve and camming parts outside of said sleeve and merging with said fitting-engaging parts, a lubricant operated piston for causing said jaws to clamp a fitting, said piston having an annular inclined jaw-engaging surface, and sealing means positioned between said jaws.

3. A coupler comprising a base, a sleeve secured to said base, said sleeve having an inwardly directed flange at an end remote from said base, jaws partially enclosed in said sleeve and having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said jaws having fitting-engaging parts extending beyond said sleeve and guiding parts outside of said sleeve and merging with said fitting-engaging parts, a lubricant operated piston for causing said jaws to clamp a fitting, said piston having an annular inclined jaw-engaging surface, sealing means positioned between said jaws, and a spring for actuating said piston and jaws.

4. A coupler comprising a base, a sleeve removably secured to said base, said sleeve having an inwardly directed flange at an end remote from said base, jaws partially enclosed in said sleeve and having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said jaws having fitting-engaging ends beyond said sleeve, a lubricant operated piston for causing said jaws to clamp a fitting, said piston having an annular inclined jaw-engaging surface, said jaws having opposite ends adapted to engage said surface, sealing means positioned between said jaws, and a spring for actuating said piston and jaws.

5. A coupler comprising a base, a sleeve removably secured to said base, said sleeve having an inwardly directed flange at an end remote from said base, jaws partially enclosed in said sleeve and having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said jaws having fitting-engaging parts extending beyond said sleeve and camming parts outside of said sleeve and merging with said fitting-engaging parts, a lubricant operated piston for causing said jaws to clamp a fitting, said piston having an annular inclined jaw-engaging surface, sealing means on said piston and positioned between said jaws, and a spring for actuating said piston and jaws.

6. A coupler comprising a base, a sleeve removably secured to said base, said sleeve having an inwardly directed flange at an end remote from said base, jaws partially enclosed in said sleeve and having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said jaws having fitting-engaging parts extending beyond said sleeve and camming parts outside of said sleeve and merging with said fitting-engaging parts, a lubricant operated piston for causing said jaws to clamp a fitting, said piston having an annular inclined jaw-engaging surface, sealing means on said base and positioned between said jaws, and a spring for actuating said piston and jaws.

7. A coupler comprising a base, a sleeve secured to said base, said sleeve having an annular groove at one end remote from said base, jaws partially enclosed in said sleeve and having flanges cooperating with said groove to prevent movement of said jaws lengthwise of said sleeve, said jaws having fitting-engaging parts extending beyond said sleeve and camming parts outside of said sleeve and merging with said fitting engaging parts, a lubricant operated piston for causing said jaws to clamp a fitting, said piston having an annular inclined jaw-engaging surface, sealing means positioned between said jaws, and a spring for actuating said piston and jaws.

8. A coupler of the class described, comprising a base having a forwardly extending tubular portion, a sleeve secured to said base and surrounding said tubular portion in spaced relation thereto, an annular piston located between said tubular portion and sleeve, said sleeve having an inwardly directed annular flange at an end remote from said base, jaws located in said sleeve and having ends and intermediate portions, said intermediate portions having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said piston having a frusto-conical part engaging one end of each jaw, each jaw having a fitting-engaging part remote from said last-named end, and means for making a sealed connection with a lubricant-receiving fitting.

9. A coupler of the class described, comprising a base having a forwardly extending tubular portion, a sleeve secured to said base and surrounding said tubular portion in spaced relation thereto, an annular piston located between said tubular portion and sleeve, said sleeve having an inwardly directed annular flange at an end remote from said base, jaws located in said sleeve and having ends and intermediate portions, said intermediate portions having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve and rounded piston-engaging parts, said piston having a frusto-conical part engaging said last-named parts, each jaw having a fitting-engaging end and a second end engaging said tubular portion, and means for making a sealed connection with a lubricant-receiving fitting.

10. A coupler of the class described, comprising a base having a forwardly extending tubular portion, a sleeve secured to said base and surrounding said tubular portion in spaced relation thereto, an annular piston located between said tubular portion and sleeve, said sleeve having an inwardly directed annular flange at an end remote from said base, jaws located in said sleeve and having ends and intermediate portions, said intermediate portions having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said piston having a frusto-conical part engaging one end of each jaw, each jaw having a fitting-engaging and a guiding part remote from said last-named end, and means for making a sealed connection with a lubricant-receiving fitting.

11. A coupler of the class described, comprising a base having a forwardly extending tubular portion, a sleeve secured to said base and surrounding said tubular portion in spaced relation thereto, an annular piston located between said tubular portion and sleeve, said sleeve having an inwardly directed annular flange at an end remote from said base, jaws located in said sleeve and having ends and intermediate portions, said intermediate portions having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said piston having a frusto-conical part engaging one end of each jaw, each jaw having a fitting-engaging part remote from said last-named end, and means on said tubular portion for making a sealed connection with a lubricant-receiving fitting.

12. A coupler of the class described, comprising a base having a forwardly extending tubular portion, a sleeve secured to said base and surrounding said tubular portion in spaced relation thereto, a piston located in said sleeve, said sleeve having an annular groove at an end remote from said base, jaws located in said sleeve and having ends and intermediate portions, said intermediate portions having flanges cooperating with said groove to form a pivotal connection, said piston having a frusto-conical part engaging one end of each jaw, each jaw having a fitting-engaging part remote from said last-named end, and means for making a sealed connection with a lubricant-receiving fitting.

13. A coupler of the class described, comprising a base having a forwardly extending tubular portion, a sleeve secured to said base and surrounding said tubular portion in spaced relation thereto, a piston located in said sleeve, said sleeve having an inwardly directed annular flange at an end remote from said base, jaws located in said sleeve and having ends and intermediate portions, said intermediate portions having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said piston having a frusto-conical part engaging one end of each jaw, a spring for advancing said piston, said tubular portion acting as a stop to limit rearward movement of said piston, each jaw having a fitting-engaging part remote from said last-named end, and means for making a sealed connection with a lubricant-receiving fitting.

14. A coupler of the class described, comprising a base having a forwardly extending tubular portion, a sleeve secured to said base and surrounding said tubular portion in spaced relation thereto, a tubular piston located in said sleeve, said sleeve having an inwardly directed annular flange at an end remote from said base, jaws located in said sleeve and having ends and intermediate portions, said intermediate portions having flanges cooperating with said first-named flange, said flanges having engaging surfaces substantially normal to the axis of said sleeve to limit outward movement of said jaws relative to said sleeve and to establish a fixed gripping position of said jaws longitudinally of said sleeve, said piston having a frusto-conical part engaging one end of each jaw, each jaw having a fitting-engaging part remote from said last-named end, and means on said piston for making a sealed connection with a lubricant-receiving fitting.

15. A coupler of the class described comprising in combination a hollow base adapted to be connected to a source of lubricant under pressure, a cylindrical sleeve having an end secured to said hollow base, said sleeve having an axis and having a second end provided with an inwardly directed annular flange having inner and outer surfaces, said inner surface being nearer said secured end and being substantially perpendicular to the axis of said sleeve, three lever-type jaws each having a portion pivotally engaging said inner surface of said sleeve and restrained by said surface against axial movement outwardly of said sleeve, each of said lever-type jaws having a fitting-engaging portion adjacent one end thereof and a piston-engaging portion adjacent the other end thereof, a hollow piston slidable in said sleeve, said piston having a jaw-engaging portion and being actuated by lubricant pressure to engage said jaws and pivot them about said inner surface to fitting-engaging position, and means for creating a lubricant-tight seal with a lubricant-receiving fitting whereby lubricant passing through said hollow piston is forced into said fitting.

ERNEST W. DAVIS.

REFERENCES CITED

The following references are of record in the file of this patent:

UNITED STATES PATENTS

| Number | Name | Date |
|---|---|---|
| 1,593,791 | Butler | July 27, 1926 |
| 1,711,870 | Zerk | May 7, 1929 |
| 1,871,370 | Jacques | Aug. 9, 1932 |
| 2,047,132 | Williams | July 7, 1936 |
| 2,061,086 | Nord | Nov. 17, 1936 |
| 2,083,035 | Rogers | June 8, 1937 |
| 2,362,880 | Campbell | Nov. 14, 1944 |
| 2,396,499 | Fitch | Mar. 12, 1946 |